United States Patent [19]
Wagner

[11] 3,737,240
[45] June 5, 1973

[54] EXPOSURE INDICATOR IN A PHOTOGRAPHIC CAMERA

[75] Inventor: Karl Wagner, Ottobrunn, Germany

[73] Assignee: Agfa-Gevaert Aktiengesellschaft, Leverkusen, Germany

[22] Filed: Dec. 23, 1971

[21] Appl. No.: 211,209

[30] Foreign Application Priority Data

Dec. 24, 1970 Germany..................P 20 63 704.1

[52] U.S. Cl. ....................356/227, 356/218, 356/226
[51] Int. Cl................................................G01j 1/42
[58] Field of Search......................356/218, 226, 227

[56] References Cited
UNITED STATES PATENTS 3,476,944  11/1969  Odone..................................356/226
3,584,962  6/1971   Irwin et al. ..........................356/227
3,603,799  9/1971   Nobusawa............................356/227

Primary Examiner—Ronald L. Wibert
Assistant Examiner—V. P. McGraw
Attorney—Michael S. Striker

[57] ABSTRACT

A photoelectric element furnishes a signal corresponding to the light available for an exposure. The photoelectric element is connected to a plurality of threshold stages. A plurality of indicator elements which glow when energized are arranged in space and connected to the threshold stages in such a manner that glowing indicator elements form a figure signifying the particular exposure time range.

12 Claims, 1 Drawing Figure

PATENTED JUN 5 1973
3,737,240
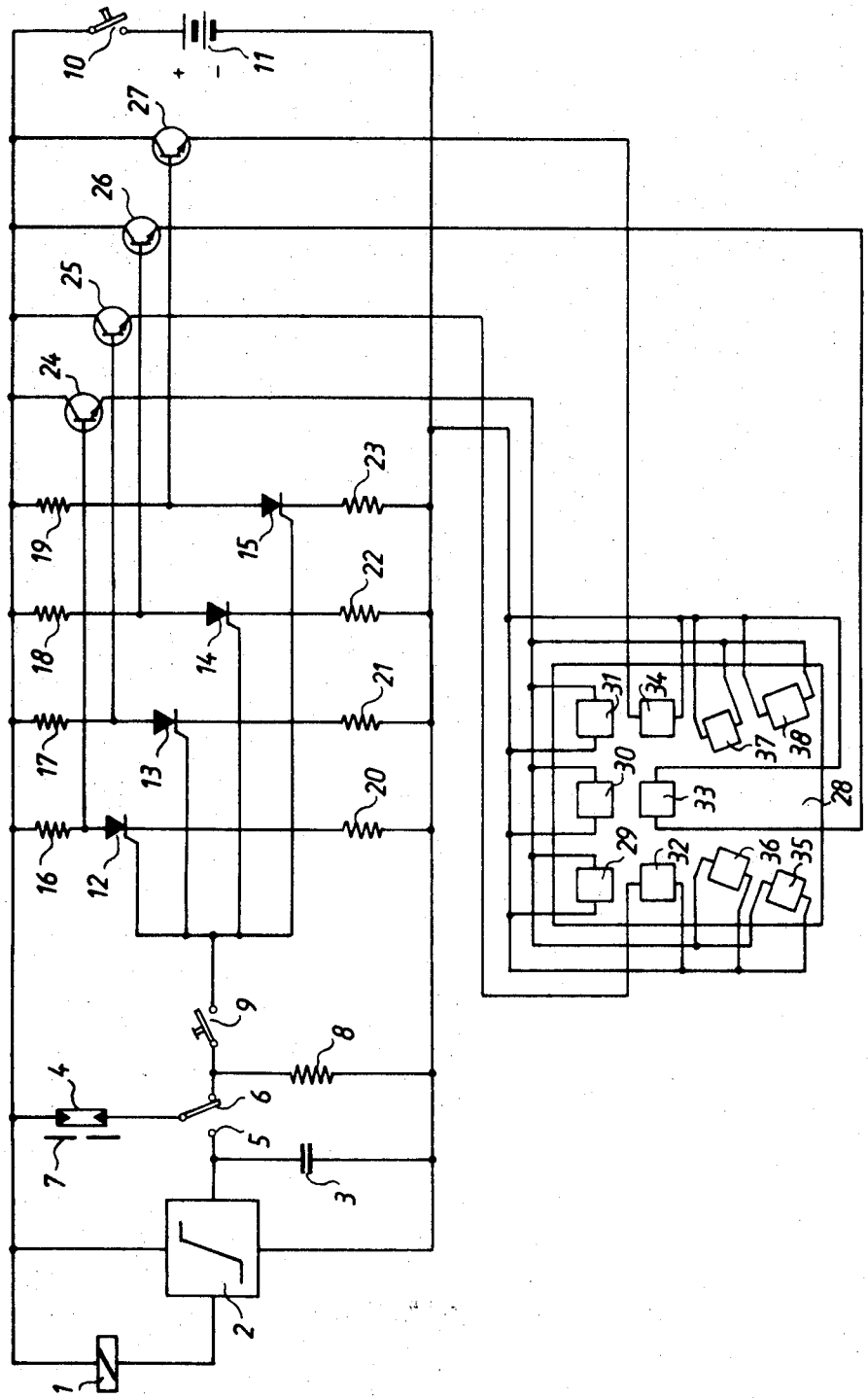
INVENTOR
KARL WAGNER
BY

EXPOSURE INDICATOR IN A PHOTOGRAPHIC CAMERA

BACKGROUND OF THE INVENTION

The present invention relates to a photographic camera which has photosensitive means furnishing a signal indicative of the light available for an exposure. In particular, it concerns a photographic camera which has an arrangement for indicating a plurality of exposure regions. The present invention may be employed in a camera which uses an electronic exposure control.

SUMMARY OF THE INVENTION

It is an object of the present invention to furnish an indicator arrangement of the above described type, namely an indicator arrangement wherein an unequivocal indication for each exposure range is furnished in a simple reliable manner and further in a space conserving manner. The indications of the different exposure ranges ought to be available to the photographer in the viewfinder of the camera.

The present invention is thus a photographic camera having an indicator arrangement furnishing a plurality of symbols each signifying a predetermined exposure range. It comprises photosensitive means mounted to receive the light available for an exposure and furnishing a first signal corresponding thereto. It further comprises a plurality of threshold means connected to said photosensitive means, each of said threshold means having a threshold differing from the threshold of the others of said threshold means. It further comprises a plurality of indicator elements each luminescent when energized, which are interconnected with said threshold stages and arranged in space in such a manner that energized ones of said indicator elements form said symbols signifying said predetermined exposure ranges.

Thus, starting with low values of available light, the threshold of the first threshold stage is first passed causing the luminescent indicator elements associated with said stage to be de-energized (of course the system could also be arranged so that the corresponding indicator elements are energized). Passing of the threshold of further threshold stages causes additional indicator elements to be de-energized.

In a preferred embodiment of the present invention the indicator elements are semiconductor elements and, more particularly, luminescent diodes.

Further, the inputs of all the threshold stages are connected in common to the photosensitive element. In a particularly preferred embodiment of the present invention the indicator elements are arranged physically in the shape of a tripod and, when the available light is less than required to pass the first threshold stage, all of the indicator elements are energized. As mentioned above, passing of the threshold of the first threshold stage causes associated ones of the luminescent elements to be de-energized. Preferably, the remaining luminescent elements form a straight line band. The number of diodes in said band is, preferably, inversely proportional to the number of threshold stages whose threshold has been passed by the first signal. The length of the illuminated band thus decreases with decreasing required exposure times.

The threshold means may be threshold stages utilizing thyristors and transistors connected to said thyristors.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows a preferred embodiment of the present invention.

DESCRIPTION OF THE PREFERRED EMBODIMENT

In the FIGURE, a control relay is designated by reference numeral 1. This control relay is arranged at the output of a bistable stage 2, whose input is connected to a capacitor 3. Capacitor 3 may be connected in series with a photosensitive element 4 by means of a switch whose contact 5 is connected to said capacitor and whose movable arm is connected to said photosensitive element Further, movement of said movable arm from a terminal 5 to a terminal 6 causes the photosensitive element 4 to be connected in series with a resistance 8. A diaphragm 7 is arranged in front of the photosensitive element 4. A switch 9 connected to resistance 8 and contact 6 signifies a key operable by the user of the camera.

A voltage source, namely a battery 11 may be connected to the indicator arrangement by the closure of a switch 10.

The FIGURE further shows a plurality of thyristors numbered 12, 13, 14 and 15. Connected in the anode circuit of each of said thyristors in a resistance, numbered 16, 17, 18, and 19, respectively. In the cathode circuit of each thyristor 12-15 is connected a resistance, numbered 20-23, respectively. The control electrodes of all thyristors are connected in common and are further connected through key 9 to the voltage divider comprising the photosensitive element 4 and resistance 8.

The anodes of thyristors 12, 13, 14, and 15 are respectively connected to the bases of transistors 24, 25, 26 and 27. The collectors of all of said transistors are connected to the positive side of battery 11 through switch 10. A plurality of luminescent diodes, numbered 29 through 38 are arranged on a plate 28 in the shape of a tripod.

Diodes 29, 30, 31, 35, 36, 37 and 38 are connected in parallel in the emitter circuit of transistor 24.

Diode 32 is in the emitter circuit of transistor 25, diode 33 in the emitter circuit of transistor 26 and diode 34 is connected in the emitter circuit of transistor 27.

The threshold values of thyristors 12 to 15 are chosen to differ from one another. Thus the resistance values of resistors 20 through 23 differ. The threshold value of thyristor 12 is made, by a suitable choice of the resistance of resistor 20 to be the lowest threshold value, while the thresholds of the further transistors 13 through 15 are similarly determined by the resistance values of resistors 21-23 to be increasingly higher.

The above-described arrangement operates as follows: It is first assumed that the light available for an exposure is such that it is not possible to carry out a hand-held exposure. The resistance of the photosensitive element 4 is so high that the voltage developed across resistance 8 is less than the threshold value for any of the thyristors. Therefore, the bases of transistors 24–27 are positive relative to the corresponding emitters. Therefore transistors 24–27 are conductive. All diodes 29–38 glow. The photographer sees the image of a stylized tripod through the viewfinder.

If now the illumination is such that the voltage developed across resistance 8 exceeds the threshold value of thyristor 12 but is below the threshold value of thyristors 13, 14 and 15, then thyristor 12 becomes conductive while the remaining thyristors remain blocked. Therefore a voltage is developed at the base of transistor 24 which blocks transistor 24. The remaining transistors, namely transistors 25, 26 and 27 remain in the conductive state.

Since transistor 24 is blocked, diodes 29, 30, 31, 35, 36, 37 and 38 are de-energized. Thus only diodes 32, 33 and 34 glow and the photographer sees a long illuminated band which signifies the exposure time of, for example, one-thirtieth of a second.

If the illumination intensity now increases so that a voltage is developed across resistance 8 which exceeds the threshold values of thyristors 12 and 13 but is less than the threshold voltage required for thyristors 14 and 15, then transistors 24 and 25 are blocked while transistors 26 and 27 are conductive. Thus only diodes 33 and 34 glow. They form an illuminated band of medium length and indicate a required exposure time of one-sixtieth of a second to the photographer. If the illumination intensity increases even further so that the threshold voltage which is developed accross resistance 8 exceeds the threshold of thyristors 12, 13 and 14 but is less than the threshold voltage required for thyristor 15, then transistors 24, 25 and 26 are blocked, while transistor 27 is conductive. Thus diode 34 glows. This is the shortest possible illuminated band. It indicates to the photographer than an exposure time of, for example, 1/125th seconds is required.

A further increase in illumination causes the threshold of thyristor 15 to be exceeded, so that this thyristor also fires. This causes all transistors, 24–27 to block and all diodes to be de-energized. The absence of any luminous band may serve as an indication that an upper permissible value of illumination has been exceeded.

If now the key 9 is no longer depressed by the photographer and the release is operated (not shown in the FIGURE) then contact 6 opens and contact 5 is closed. This causes the automatic exposure control arrangement comprising relay 1, bistable stage 2 and capacitor 3 to operate in known manner, that is, capacitor 3 charges through the photosensitive element (photoresistance) 4. After the threshold value of bistable state 2 has been exceeded, the relay 1, which was previously energized, is de-energized and the exposure time completed.

While the invention has been illustrated and described as embodied in particular types of threshold means, it is not intended to be limited to the details shown, since various modifications and structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

I claim:

1. In a photographic camera an indicator arrangement furnishing a plurality of symbols each signifying a predetermined exposure range, comprising, in combination, photosensitive means mounted to receive light available for an exposure and furnishing a first signal corresponding thereto; a plurality of threshold means corresponding in number to said plurality of symbols connected to said photosensitive means, each for furnishing a threshold signal in response to a corresponding predetermined amplitude of said first signal; a plurality of indicator elements for furnishing visual outputs constituting said symbols when energized; first connecting means connecting said plurality of indicator elements into a plurality of groups, at least one of said groups having at least two of said indicator elements; and second connecting means connecting each of said groups of indicator elements to a corresponding one of said threshold means in such a manner that all of the indicator elements of group are energized in response to said threshold signal of said corresponding one of said threshold means.

2. An arrangement as set forth in claim 1, wherein said indicator elements are semiconductor elements.

3. An arrangement as set forth in claim 2, wherein said semiconductor elements are glow diodes.

4. An arrangement as set forth in claim 1, further comprising connecting means connecting the inputs of all of said threshold means in common to said photosensitive means.

5. An arrangement as set forth in claim 4, wherein all of said indicator elements together form the shape of a tripod.

6. An arrangement as set forth in claim 5, wherein all of said indicator elements are energized and luminescent when said first signal has a magnitude below the threshold of any of said threshold means.

7. An arrangement as set forth in claim 6, wherein said plurality of threshold means comprise a first threshold stage having a threshold corresponding to a maximum required exposure time; and wherein the indicator elements remaining energized after said first signal exceeds the threshold of said first threshold stage form a straight line band.

8. An arrangement as set forth in claim 7, wherein said plurality of threshold means comprise a plurality of threshold stages; and wherein the number of luminescent indicator elements is a function of the number of threshold stages whose threshold is exceeded by said first signal.

9. An arrangement as set forth in claim 8, wherein the number of luminescent indicator elements is inversely proportional to the number of said threshold stages whose threshold is exceeded by said first signal.

10. An arrangement as set forth in claim 4, further comprising a source of electrical energy; and wherein each of said threshold means comprise transistor means having an emitter-collector circuit connected to said source of electrical energy and a base, and thyristor means having a gate connected to said photosensitive means and an anode-cathode circuit connected to said base of said transistor means; and wherein said second connecting means connect each of said groups of indicator elements in series with said emitter-collector circuit of a corresponding one of said transistor means.

11. An arrangement as set forth in claim 10, further comprising a plurality of first resistors, each connected between said cathode of a corresponding one of said thyristor means and said source of electircal energy, for creating a threshold value in each of said threshold means differing from the threshold value of the others of said threshold means.

12. An arrangement as set forth in claim 11, wherein each of said bases of said transistor means is directly connected to said anode of said corresponding one of said thyristor means; further comprising a plurality of second resistor means each connected from the base of a corresponding one of said transistors to said source of electrical energy in such a manner that each of said transistors is conductive when the corresponding one of said thyristor means is non-conductive.

* * * * *